Patented Feb. 4, 1941

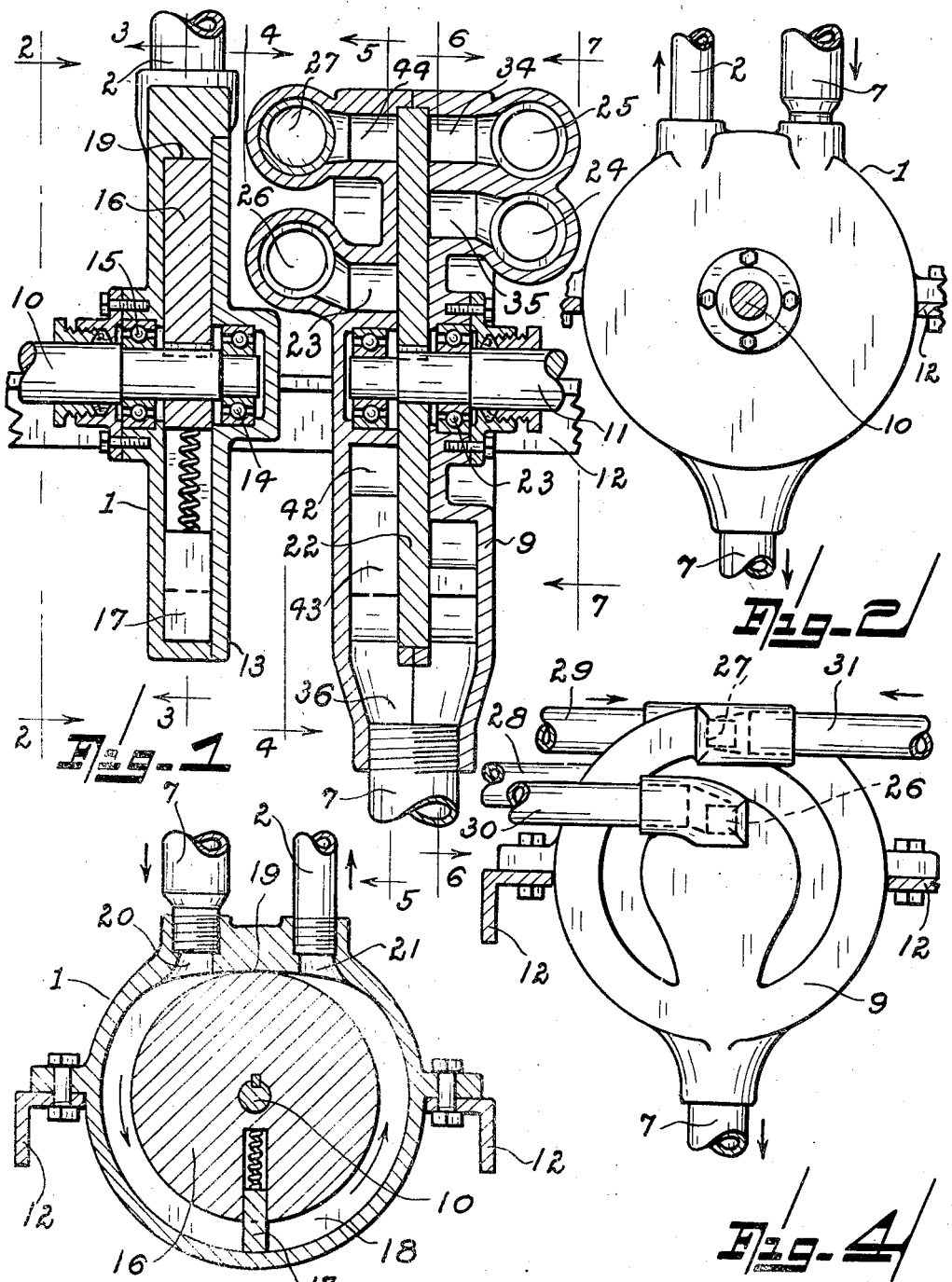

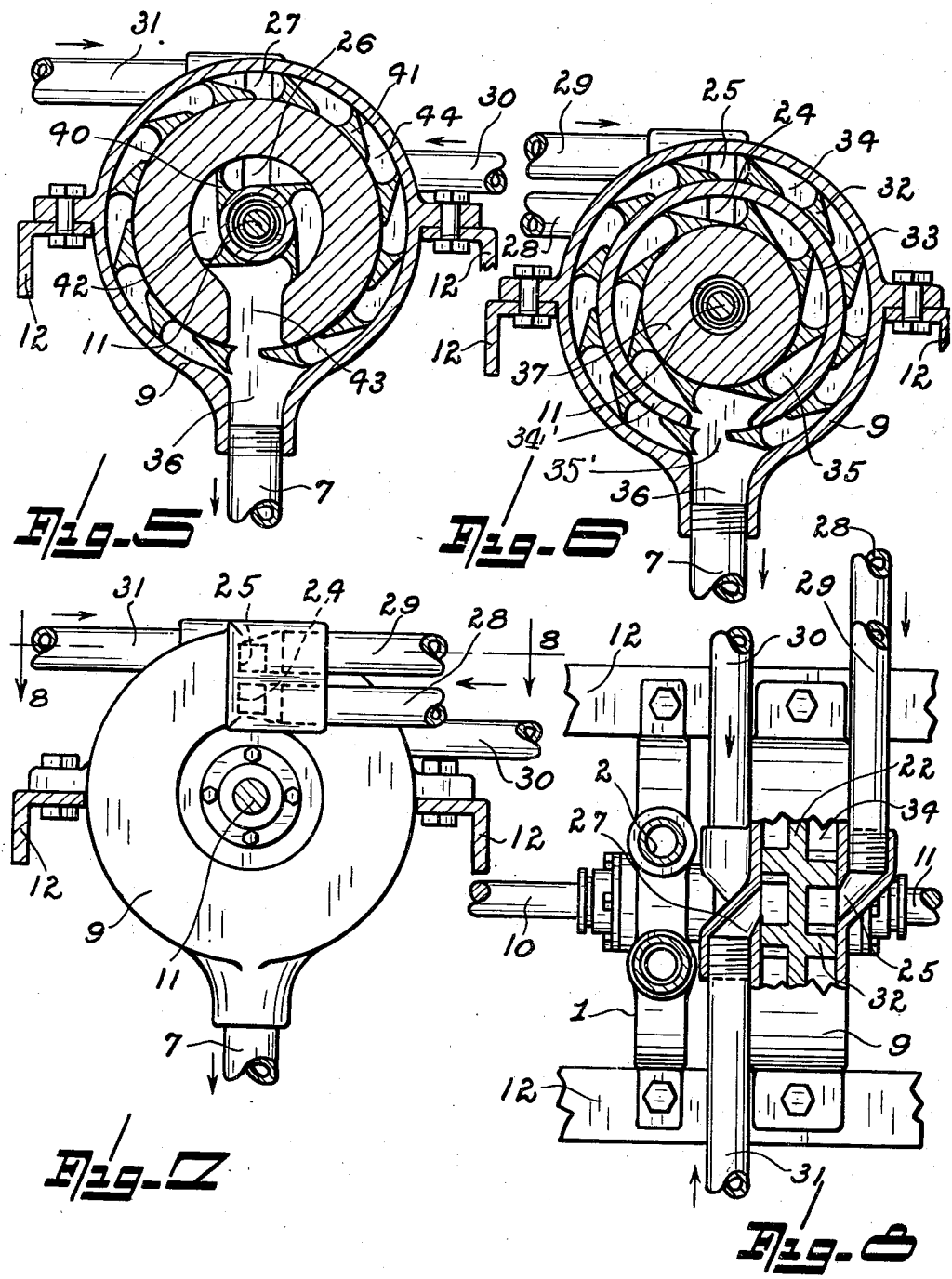

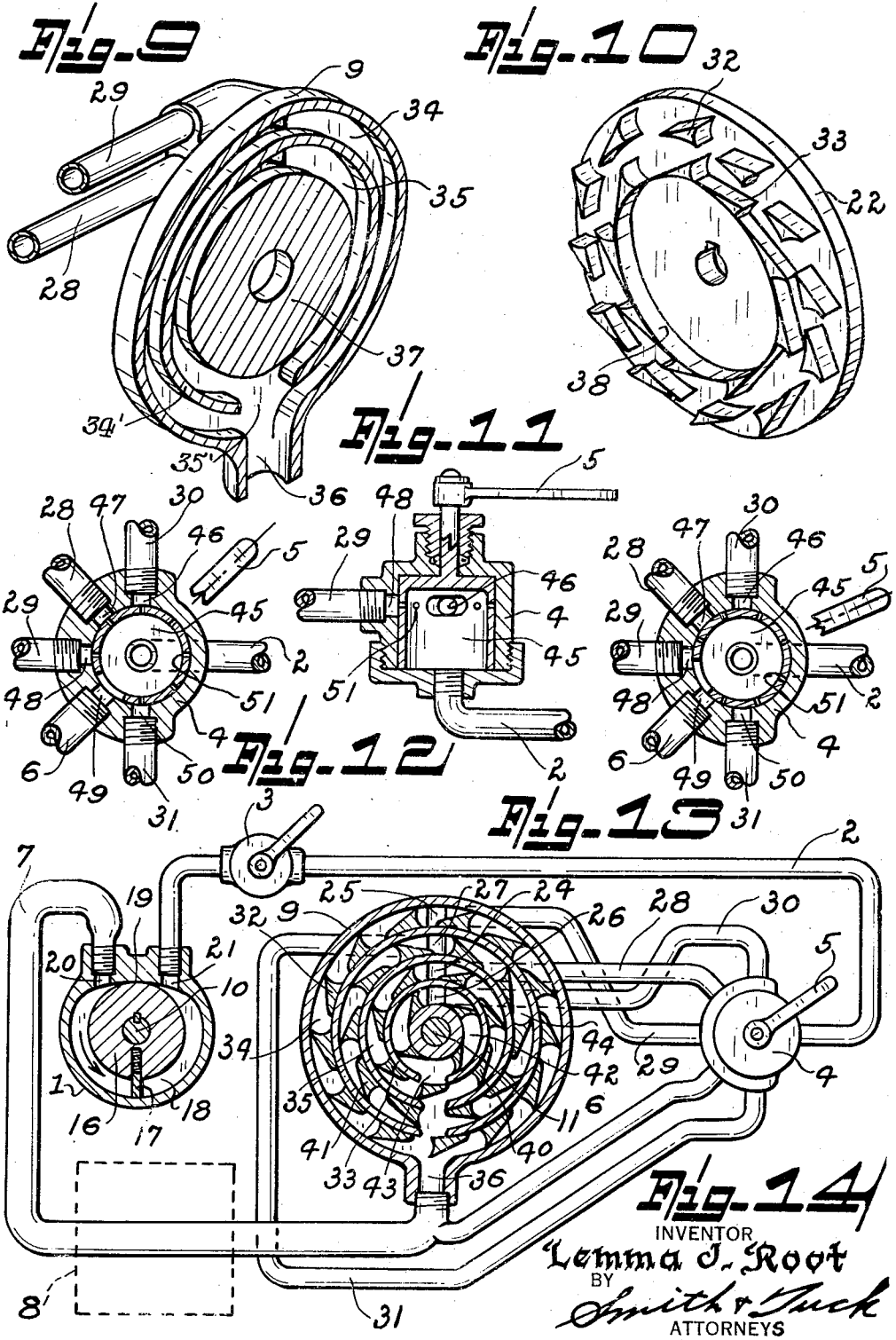

2,230,545

UNITED STATES PATENT OFFICE 2,230,545

HYDRAULIC ROTARY VARIABLE TRANSMISSION MECHANISM

Lemma J. Root, Bothell, Wash.

Application June 27, 1939, Serial No. 281,387

5 Claims. (Cl. 253—132)

My present invention relates to an improved hydraulic rotary variable transmission mechanism of the turbine type which, while adapted for transmitting power from a drive shaft to a driven shaft through a fluid torque movement for various uses, is especially designed for use between the engine and the propelling mechanism of an automotive vehicle.

In carrying out my invention I employ a closed hydraulic, or oil, system comprising a rotary pump with its shaft revolved by direct or indirect connection with the vehicle engine, and a double face power-transmitting disk or rotor mounted rigidly on the driven or propeller shaft of an automotive vehicle, and enclosed in a transmission casing.

The double faces of the rotor are each fashioned with a pair of turbines which revolve in channels or chambers of the stationary transmission casing, the turbines varying in diameter and capacity to provide for three forward speeds and a reverse speed of the rotor, thus providing a variable torque movement between the driving shaft and the driven shaft, and in addition the transmission system is provided with an idling movement without torque between the two shafts.

A single valve is included in the fluid transmission system which is provided with various controlling ports for the flow of oil under pressure from the pump to the transmission case to insure variable speeds of the rotor and the driven shaft, so that the usual shifts from low speed to second speed, and to high speed of the driven shaft may be accomplished smoothly by a simple turning movement of the control valve lever.

After the transmission mechanism has been set for one speed, the steady and constant flow of oil under pressure through the system results in the maintenance of a uniform speed of the driven shaft, and changes in the speed of the shaft may be accomplished without necessity for releasing the clutch, due to the torque connection between the drive shaft and the driven shaft.

The hydraulic transmission mechanism is also capable of use as an auxiliary to the braking system of an automotive vehicle, and performs the functions of a "hill holder" when the control valve is turned to proper position to prevent relative movement of the driven shaft in connection with the drive shaft.

The invention consists in certain novel combinations and arrangements of parts as will hereinafter be more fully set forth and claimed. In the accompanying drawings I have illustrated one complete example of the physical embodiment of my invention wherein the parts are combined and arranged according to one mode I have thus far devised for the practical application of my invention, but it will be understood that various changes and alterations may be made in these exemplifying structures within the scope of my claims without departing from the principles of the invention.

In the drawings:

Figure 1 is a vertical longitudinal sectional view showing the rotary pump mounted on the drive shaft, and hydraulic change speed gearing of the turbine type for transmitting power from the drive shaft to the driven shaft.

Figure 2 is a view in elevation as at line 2—2 of Figure 1.

Figure 3 is a transverse vertical sectional view of the rotary expansible cylinder type of pump showing its drive shaft, as at line 3—3 of Figure 2.

Figure 4 is a side view in elevation of the transmission gear case looking from the pump side as at line 4—4 of Figure 2, showing the high-speed intake, and the reverse speed intake, at the near side of the case, together with the low-speed intake and the second speed intake at the far side of the figure of drawing.

Figure 5 is a vertical sectional view at line 5—5 of Figure 1 showing the central, high-speed turbine-buckets, and the reverse turbine-buckets with the drain ports for the spent fluid or oil which is returned to the pump.

Figure 6 is a similar sectional view at line 6—6 of Figure 1 showing the low-speed and second-speed turbine buckets in their annular channels which communicate with the outlet for spent oil flowing to the single return pipe to the pump.

Figure 7 is a side elevation of the gear case as at line 7—7 of Figure 1, showing the intake ports for the low-speed and second-speed transmission respectively.

Figure 8 is a top plan view of the unit including the pump and the gear case supported upon frame members, with a top portion of the gear case cut away as at line 8—8 of Figure 7 to disclose the double face disk or rotor with a pair of turbine buckets at each side of the rotor with intake ports or nozzles opening to the interior of the gear case.

Figure 9 is a perspective view showing a section of the gear case with its annular channels for the low-speed turbine-buckets and also for the second-speed turbine buckets; and Figure 10 is a complementary perspective view showing one side of the rotor with low-speed turbine-buckets and the second-speed turbine-buckets.

Figures 11, 12 and 13 are sectional detail views of the rotary control valve, and its connection or intake from the pump together with five outlet pipes and ports, one for idling, another for reverse, and the remaining three for the variable high, low, and second speeds of the transmission mechanism.

Figure 14 is a diagrammatic view of the mechanism, showing the pump, cut-off pipe, control valve and connections from the valve to the composite showing of the fluid pressure turbines, together with the enlarged pump-supply pipe acting as a reservoir for the spent oil.

Referring to the diagrammatic view of Figure 14, which shows the relation of parts of the transmission unit, the rotary pump is indicated as a whole by the number 1, having a main feed pipe 2 which is provided with a cut-off valve 3, and is connected with the bottom portion of the cylindrical casing 4 which contains the control valve, which is adjusted by turning the single exterior valve-handle or lever 5, which is located in a position readily accessible for the driver of an automotive vehicle. From the valve casing 4 an idling pipe 6 extends to the enlarged oil supply pipe 7, which pipe, in the nature of a reservoir for spent oil is connected to the pump as a supply pipe thereto, thus providing a closed idling circuit (when cut-off valve 3 is open) which has no effect upon the power transmission mechanism.

If necessary, a suitable cooler, as 8 (dotted lines in Figure 14) may be mounted on the enlarged oil-supply pipe in order to cool the oil used as a fluid pressure element in the transmission gear case 9 to which the supply pipe is connected, and this pipe is connected also to the intake side of the pump.

In the diagrammatic view of Figure 14 it will be understood that the parts, as shown, are out of position, and it will be apparent in Figures 1 and 8 that the rotary pump shaft or drive shaft 10 is actually aligned with the driven shaft 11, which is journaled in the gear case, and that the pump 1 and gear case 9 are supported in parallel planes on the frame members 12, with the oil pipes, the control valve 4 and the cut-off valve 3 located in suitable and accessible positions.

In Figures 1 and 2 where details of the rotary expansible chamber pump are disclosed, the pump casing is provided with a side plate 13 to accommodate bearings 14 and similar bearings 15 are provided in the circular wall of the casing for the journals of the drive shaft. Between the bearings a circular pump disk 16 is fixed on the drive shaft and revolves therewith in the pump casing in the direction of the arrows in Figure 3, and the disk is slotted to receive the spring-pressed radially disposed blade or piston 17, movable toward and from the central drive shaft in traversing the annular pump chamber 18. At the top of the annular chamber 18 its outer circular wall is fashioned with an inner cam wall 19 having spaced intake port 20 and outlet port 21 to which the large intake pump-supply pipe 7 and the pump outlet pipe 2 are respectively connected. Between these ports the periphery of the rotary pump disk is constantly in frictional contact with the cam wall 19, and it will be evident that as the disk 16 rotates the sweep of the spring-pressed blade or piston transfers the incoming oil to the outlet port 21 and feed pipe 2 leading to the control valve.

As seen in Figure 1 the transmission casing 9 is fashioned with two sections, bolted together to form the interior transmission chamber, and a single rotary transmission disk 22, which is keyed to the driven shaft 11, is journaled in spaced bearings at opposite sides of the rotor or rotary transmission disk 22. The rotary driven shaft or rotor, journaled in bearings 23 through the instrumentality of the driven shaft 11 are driven at three variable forward speeds, and at a reverse speed, by fluid pressure from the pump and its feed or outlet pipe, and these variable movements of the rotor and the driven shaft are controlled by the position of the control valve as manipulated by the handle 5.

Thus, as seen in Figure 1 the transmission case 9 at one side is fashioned with a second-speed inlet port 24 and a low-speed inlet port 25. At the opposite side of the transmission case are fashioned a high-speed port 26, and a reverse-speed port 27. These intake ports of the transmission casing are connected by separated pipes with the control valve casing, as seen in Figure 14 as follows: Second-speed pipe 28 leads to port 24; low-speed pipe 29 leads to port 25; high-speed pipe 30 leads to port 26; and the reverse pipe 31 leads to port 27.

The disk or power transmitting rotor 22 is fashioned in the form of a double-face turbine wheel, and is provided at its opposite sides, each with two annular series of turbine-buckets, and as seen in Figures 9 and 10, the outermost series of buckets 32 is for low-speed transmission, and the next inner series of buckets 33 is for second-speed. These two annular series of buckets fit into and rotate within two channels 34 and 35 of the transmission chamber, and these channels open at their lower ends into an outlet port 36 to which the pump-supply pipe 7 is connected.

As seen in Figure 9 the inner channel 35 surrounds a central annular bearing head or core 37 of the casing, and the outer concentric channel 34 is spaced from the channel 35 by means of an interrupted annular wall 34' located intermediate of the bearing head and the exterior wall of the case 9. The interior open sides of these channels are closed by the rotor 22, and the intermediate wall 34' is interrupted at 35' to communicate with the outlet port 36. Thus the channels have separate inlet ports 25 and 24 and a single, common outlet 36.

As indicated in Figures 9 and 10, the center bearing core 37 at one side of the transmission casing, fits neatly within the complementary circular recess 38 in the adjoining side of the rotor to provide a substantial bearing for the rotor.

As seen in Figure 10 it will be apparent that oil under pressure delivered through either low-speed pipe 29 or second-speed pipe 28, will impinge against the annular series of turbine-buckets 33 or 32 respectively and thus revolve the rotor at a selected speed, and the used or spent oil will be emptied or discharged from the buckets through port 36 to the pump-supply pipe 7 and thus returned to the intake side of the pump.

Having thus fully described my invention, what I claim as new and desire to secure by Letters Patent is:

1. The combination in a variable speed hydraulic transmission mechanism, with a transmission casing having an interrupted inner wall forming a pair of interior concentric annular channels and an outlet port therefrom, and a separate fluid-pressure pipe leading to each of said channels, of a driven shaft journaled in said casing, a rotor within the casing and fixed to the shaft, two annular series of turbine-buckets mounted on the rotor and located in said channels, and a central frictional bearing between said rotor and the casing.

2. The combination in a variable-speed hydraulic transmission mechanism, with a transmission casing having a central circular bearing head and an annular ported wall spaced between said head and the outer wall of the case forming a pair of interior concentric annular channels and an outlet port therefrom, and separate fluid-pressure pipes leading to each of said channels, of a driven shaft journaled in said casing, a rotor having a central circular bearing-recess fixed to the shaft and located within the casing, said rotor also having two annular series of turbine-buckets concentric with the bearing recess and located in said channels.

3. The combination in a variable-speed hydraulic transmission mechanism, with a transmission casing having at one side a central circular bearing head and a pair of concentric channels, and exterior fluid-pressure pipes leading to each of said channels, of a driven shaft journaled in the casing, an interior rotor fixed to said shaft and having a complementary central bearing-recess, said rotor having two annular series of turbine-buckets concentric with said recess and located in said channels, said casing at its opposite side having an interior central circular chamber and a concentric channel, a series of turbine-buckets mounted on the rotor and located in said circular chamber and a fluid pressure pipe leading to said chamber, a second reversely arranged concentric annular series of turbine-buckets mounted on the rotor and located in the outer concentric channel and a fluid pressure pipe leading thereto, and said casing having an outlet port from said channels and chamber.

4. The combination in a variable speed hydraulic transmission mechanism, with a casing having concentric annular channels open at their inner sides, and separate inlets and a common outlet to and from said channels, of a driven shaft journaled in the casing, a rotor fixed on the shaft and closing the open inner sides of the channels, and two annular series of turbine-buckets mounted on the rotor and movable through said channels.

5. The combination in a variable speed hydraulic transmission mechanism, with a casing having concentric annular channels open at their inner sides, and separate inlets and a common outlet to and from said channels, of a driven shaft journaled in the casing, a rotor fixed on the shaft and closing the open inner sides of the channels, two annular series of turbine-buckets mounted on the rotor and movable through said channels, and one of said series of turbine buckets being reversed with relation to the remaining series of turbine-buckets.

LEMMA J. ROOT.